US012499837B2

(12) United States Patent
Sohn et al.

(10) Patent No.: US 12,499,837 B2
(45) Date of Patent: Dec. 16, 2025

(54) DISPLAY APPARATUS AND METHOD OF DRIVING THE SAME

(71) Applicant: Samsung Display Co., Ltd., Yongin-Si (KR)

(72) Inventors: Youngha Sohn, Yongin-si (KR); Sehyuk Park, Yongin-si (KR); Jin-Wook Yang, Yongin-si (KR); Donggyu Lee, Yongin-si (KR); Jae-Hyeon Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/963,690

(22) Filed: Nov. 28, 2024

(65) Prior Publication Data

US 2025/0232725 A1 Jul. 17, 2025

(30) Foreign Application Priority Data

Jan. 16, 2024 (KR) ........................ 10-2024-0006840

(51) Int. Cl.
*G09G 3/32* (2016.01)
*G09G 3/3233* (2016.01)

(52) U.S. Cl.
CPC ..... *G09G 3/3233* (2013.01); *G09G 2300/026* (2013.01); *G09G 2300/0426* (2013.01); *G09G 2300/0819* (2013.01); *G09G 2300/0852* (2013.01); *G09G 2300/0861* (2013.01); *G09G 2320/045* (2013.01); *G09G 2320/0673* (2013.01); *G09G 2330/021* (2013.01); *G09G 2330/028* (2013.01)

(58) Field of Classification Search
CPC ........... G09G 3/3233; G09G 2300/026; G09G 2300/0426; G09G 2300/0819; G09G 2300/0852; G09G 2300/0861; G09G 2320/045; G09G 2320/0673; G09G 2330/021; G09G 2330/028
See application file for complete search history.

(56) References Cited

U.S. PATENT DOCUMENTS 9,041,626 B2 5/2015 Park et al.
11,263,976 B2 * 3/2022 Yang .................... G09G 3/3233
(Continued)

FOREIGN PATENT DOCUMENTS

KR 10-0894606 B1 4/2009
KR 10-2023-0139915 A 10/2023
KR 10-2024-0033711 A 3/2024

*Primary Examiner* — Pegeman Karimi
(74) *Attorney, Agent, or Firm* — Innovation Counsel LLP

(57) ABSTRACT

A display apparatus includes a display panel, a data driver, a power saving mode determiner, a power voltage control signal generator and a power voltage generator. The data driver is configured to output a data voltage to the display panel. The power saving mode determiner is configured to determine a driving mode selected from a power saving mode and a normal mode based on a risky display quality condition. The power voltage control signal generator is configured to generate a power voltage control signal determining a level of a power voltage based on the driving mode. The power voltage generator is configured to generate the power voltage based on the power voltage control signal and to output the power voltage to at least one of the display panel and the data driver.

20 Claims, 14 Drawing Sheets

(56) References Cited

U.S. PATENT DOCUMENTS

| | | | | |
|---|---|---|---|---|
| 11,961,463 | B2 | 4/2024 | Yang et al. | |
| 11,961,474 | B2 | 4/2024 | Yang et al. | |
| 2016/0063921 | A1* | 3/2016 | Tsai | G09G 3/3233<br>345/76 |
| 2017/0148390 | A1* | 5/2017 | Park | G06F 1/3296 |
| 2020/0243008 | A1* | 7/2020 | Lee | H10D 30/6745 |

* cited by examiner

| VN4 | VN1 |
|---|---|
| 4.6vref → 6.5data | ELVDD-Vth + △V(6.5data - 4.6vref) |
| 3.6vref → 5.5data | ELVDD-Vth + △V(5.5data - 3.6vref) |
| 2.6vref → 4.5data | ELVDD-Vth + △V(4.5data - 2.6vref) |

FIG. 10

| DRIVING MODE | | DPS | NORMAL |
|---|---|---|---|
| PMS | | 0 | 1 |
| POWER VOLTAGE (V) | AVDD | 5.5 | 7.5 |
| | VREF | 2.6 | 4.6 |
| | VGM | 1.0 | 3.0 |

| DRIVING MODE | | MODE1 | MODE2 | MODE3 | MODE4 |
|---|---|---|---|---|---|
| PMS | | 00 | 01 | 10 | 11 |
| POWER VOLTAGE (V) | AVDD | 5.5 | 6.5 | 7.0 | 7.5 |
| | VREF | 2.6 | 3.6 | 4.1 | 4.6 |
| | VGM | 1.0 | 2.0 | 2.5 | 3.0 |

DISPLAY APPARATUS AND METHOD OF DRIVING THE SAME

PRIORITY STATEMENT

This application claims priority under 35 U.S.C. § 119 to Korean Patent Application No. 10-2024-0006840, filed on Jan. 16, 2024 in the Korean Intellectual Property Office KIPO, the contents of which are herein incorporated by reference in their entireties.

BACKGROUND

1. Field

Embodiments of the present inventive concept relate to a display apparatus and a method of driving the display apparatus. More particularly, embodiments of the present inventive concept relate to a display apparatus selectively operating a power saving mode to reduce a power consumption and to enhance a display quality and a method of driving the display apparatus.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver, a power voltage generator and a driving controller. The gate driver outputs gate signals to the gate lines. The data driver outputs data voltages to the data lines. The emission driver outputs emission signals to the emission lines. The power voltage generator provides a power voltage to the display panel and the data driver. The driving controller controls the gate driver, the data driver, the emission driver and the power voltage generator.

To reduce the power consumption of the display apparatus, the data voltage applied to the display panel may be reduced. However, when the data voltage applied to the display panel is reduced, a display defect of the display panel may occur according to a type of the display panel, a driving method of the display panel, etc.

SUMMARY

Embodiments of the present inventive concept provide a display apparatus selectively operating a power saving mode to reduce a power consumption and to enhance a display quality.

Embodiments of the present inventive concept also provide a method of driving the display apparatus.

In an embodiment of a display apparatus according to the present inventive concept, the display apparatus includes a display panel, a data driver, a power saving mode determiner, a power voltage control signal generator and a power voltage generator. The data driver is configured to output a data voltage to the display panel. The power saving mode determiner is configured to determine a driving mode selected from a power saving mode and a normal mode based on a risky display quality condition. The power voltage control signal generator is configured to generate a power voltage control signal determining a level of a power voltage based on the driving mode. The power voltage generator is configured to generate the power voltage based on the power voltage control signal and to output the power voltage to at least one of the display panel and the data driver.

In an embodiment, the power voltage generator may be configured to generate the power voltage having a first level in the normal mode. The power voltage generator may be configured to generate the power voltage having a second level lower than the first level in the power saving mode.

In an embodiment, the power voltage generator may be configured to generate the power voltage having a level between the first level and the second level in a transition period in which a driving mode of the display apparatus is changed from the normal mode to the power saving mode or from the power saving mode to the normal mode.

In an embodiment, the power voltage generator may be configured to generate the power voltage having a first level in the normal mode. The power voltage generator may be configured to generate the power voltage having a second level lower than the first level in a first power saving mode. The power voltage generator may be configured to generate the power voltage having a third level lower than the second level in a second power saving mode.

In an embodiment, when a status of the display apparatus is not in the risky display quality condition, the power saving mode determiner may be configured to determine the driving mode as the power saving mode. When the status of the display apparatus is in the risky display quality condition, the power saving mode determiner may be configured to determine the driving mode as the normal mode.

In an embodiment, the risky display quality condition may be a condition in which a driving frequency of the display panel may be lower than a threshold frequency.

In an embodiment, the risky display quality condition may be a condition in which the display apparatus is driven in a variable frequency driving method in which a driving frequency of the display panel in a second frame is different from a driving frequency of the display panel in a first frame.

In an embodiment, the risky display quality condition may be a condition in which the display apparatus is driven in a multi frequency driving method in which a driving frequency of a first area of the display panel is different from a driving frequency of a second area of the display panel.

In an embodiment, when the display panel is a power savable panel and a status of the display apparatus is not in the risky display quality condition, the power saving mode determiner may be configured to determine a driving mode as the power saving mode. When the display panel is not the power savable panel or when the display panel is the power savable panel and the status of the display apparatus is in the risky display quality condition, the power saving mode determiner may be configured to determine the driving mode as the normal mode.

In an embodiment, the display panel may include a pixel including a light emitting element. The pixel may be configured to receive a first power voltage, a reference voltage and the data voltage. The reference voltage may be lower than the first power voltage. The driving current of the light emitting element may be determined by a difference between the reference voltage and the data voltage.

In an embodiment, the power voltage control signal generator may be configured to generate a data power voltage control signal determining a level of a data power voltage applied to the data driver and a reference voltage control signal determining a level of the reference voltage. The power voltage generator may be configured to generate the data power voltage based on the data power voltage control signal and output the data power voltage to the data driver, and configured to generate the reference voltage based on the reference voltage control signal and to output the reference voltage to the display panel.

In an embodiment, the display apparatus may further include a gamma reference voltage generator configured to output a gamma reference voltage to the data driver based on a gamma power voltage. The power voltage control signal generator may be configured to generate a gamma power voltage control signal determining a level of the gamma power voltage. The power voltage generator may be configured to generate the gamma power voltage based on the gamma power voltage control signal and output the gamma power voltage to the gamma reference voltage generator.

In an embodiment, the pixel may include a first switching element including a control electrode connected to a first node, a first electrode connected to a second node and a second electrode connected to a third node, a second switching element including a control electrode configured to receive a data writing gate signal, a first electrode configured to receive the data voltage and a second electrode connected to a fourth node, a third switching element including a control electrode configured to receive a compensation gate signal, a first electrode connected to the first node and a second electrode connected to the third node, a fourth switching element including a control electrode configured to receive a data initialization gate signal, a first electrode configured to receive a first initialization voltage and a second electrode connected to the first node, a fifth switching element including a control electrode configured to receive the compensation gate signal, a first electrode configured to receive the reference voltage and a second electrode connected to the fourth node, a sixth switching element including a control electrode configured to receive an emission signal, a first electrode connected to the third node and a second electrode connected to an anode electrode of the light emitting element, a seventh switching element including a control electrode configured to receive a light emitting element initialization gate signal, a first electrode configured to receive a second initialization voltage and a second electrode connected to the anode electrode, a first capacitor including a first electrode connected to the first node and a second electrode connected to the fourth node and a second capacitor including a first electrode configured to receive the first power voltage and a second electrode connected to the fourth node.

In an embodiment, the pixel may include a first switching element including a control electrode connected to a first node, a first electrode connected to a second node and a second electrode connected to a third node, a second switching element including a control electrode configured to receive a data writing gate signal, a first electrode configured to receive the data voltage and a second electrode connected to a fourth node, a third switching element including a control electrode configured to receive a compensation gate signal, a first electrode connected to the first node and a second electrode connected to the third node, a fourth switching element including a control electrode configured to receive a data initialization gate signal, a first electrode configured to receive a first initialization voltage and a second electrode connected to the first node, a fifth switching element including a control electrode configured to receive the compensation gate signal, a first electrode configured to receive the reference voltage and a second electrode connected to the fourth node, a sixth switching element including a control electrode configured to receive a second emission signal, a first electrode connected to the third node and a second electrode connected to an anode electrode of the light emitting element, a seventh switching element including a control electrode configured to receive a bias gate signal, a first electrode configured to receive a second initialization voltage and a second electrode connected to the anode electrode, an eighth switching element including a control electrode configured to receive a first emission signal, a first electrode configured to receive the first power voltage and a second electrode connected to the second node, a ninth switching element including a control electrode configured to receive the bias gate signal, a first electrode configured to receive a bias voltage and a second electrode connected to the second node, a first capacitor including a first electrode connected to the first node and a second electrode connected to the fourth node and a second capacitor including a first electrode configured to receive the first power voltage and a second electrode connected to the fourth node.

In an embodiment, the pixel may include a first switching element including a control electrode connected to a first node, a first electrode connected to a second node and a second electrode connected to a third node, a second switching element including a control electrode configured to receive a data writing gate signal, a first electrode configured to receive the data voltage and a second electrode connected to a fourth node, a third switching element including a control electrode configured to receive a compensation gate signal, a first electrode connected to the first node and a second electrode connected to the third node, a fourth switching element including a control electrode configured to receive a data initialization gate signal, a first electrode configured to receive a first initialization voltage and a second electrode connected to the first node, a fifth switching element including a control electrode configured to receive the compensation gate signal, a first electrode configured to receive the reference voltage and a second electrode connected to the fourth node, a sixth switching element including a control electrode configured to receive an emission signal, a first electrode connected to the third node and a second electrode connected to an anode electrode of the light emitting element, a seventh switching element including a control electrode configured to receive a bias gate signal, a first electrode configured to receive a second initialization voltage and a second electrode connected to the anode electrode, an eighth switching element including a control electrode configured to receive the emission signal, a first electrode configured to receive the first power voltage and a second electrode connected to the second node, a ninth switching element including a control electrode configured to receive the bias gate signal, a first electrode configured to receive a bias voltage and a second electrode connected to the second node, a tenth switching element including a control electrode configured to receive the compensation gate signal, a first electrode configured to receive the first power voltage and a second electrode connected to the second node, a first capacitor including a first electrode connected to the first node and a second electrode connected to the fourth node and a second capacitor including a first electrode configured to receive the first power voltage and a second electrode connected to the fourth node.

In an embodiment, the display apparatus may further include a power voltage lookup table configured to store the power voltage control signal according to the power saving mode and the normal mode.

In an embodiment, the display apparatus may further include a driving controller configured to control an operation of the data driver and an operation of the power voltage generator and a host configured to output input image data and an input control signal to the driving controller. The host may include the power saving mode determiner. The driving controller may include the power voltage control signal generator and the power voltage lookup table.

In an embodiment, the display apparatus may further include a driving controller configured to control an operation of the data driver and an operation of the power voltage generator. The driving controller may include the power saving mode determiner, the power voltage control signal generator and the power voltage lookup table.

In an embodiment of a method of driving the display apparatus according to the present inventive concept, the method includes determining a driving mode selected from a power saving mode and a normal mode based on a risky display quality condition, generating a power voltage control signal determining a level of a power voltage based on the driving mode, generating the power voltage based on the power voltage control signal and outputting the power voltage to at least one of a display panel and a data driver and outputting a data voltage to the display panel based on input image data by the data driver.

In an embodiment, the determining the driving mode may include determining the driving mode as the power saving mode when the display panel is a power savable panel and a status of the display apparatus is not in the risky display quality condition and determining the driving mode as the normal mode when the display panel is not the power savable panel or when the display panel is the power savable panel and the status of the display apparatus is in the risky display quality condition.

According to the display apparatus and the method of driving the display apparatus, the power saving mode determiner determines the power saving mode based on the risky display quality condition, the power voltage control signal generator generates the power voltage control signal representing the level of the power voltage in the power saving mode or the normal mode and the power voltage generator generates the power voltage according to the power voltage control signal.

In this way, the power saving mode may be selectively operated so that the power consumption of the display apparatus may be reduced and the display quality of the display panel may be enhanced.

BRIEF DESCRIPTION OF THE DRAWINGS

The above and other features and advantages of the inventive concept will become more apparent by describing in detailed embodiments thereof with reference to the accompanying drawings, in which:

FIG. 10 is a table illustrating an example of the power voltage lookup table of FIG. 9;

DETAILED DESCRIPTION OF THE INVENTIVE CONCEPT

Hereinafter, the present inventive concept will be explained in detail with reference to the accompanying drawings.

Figure 1:
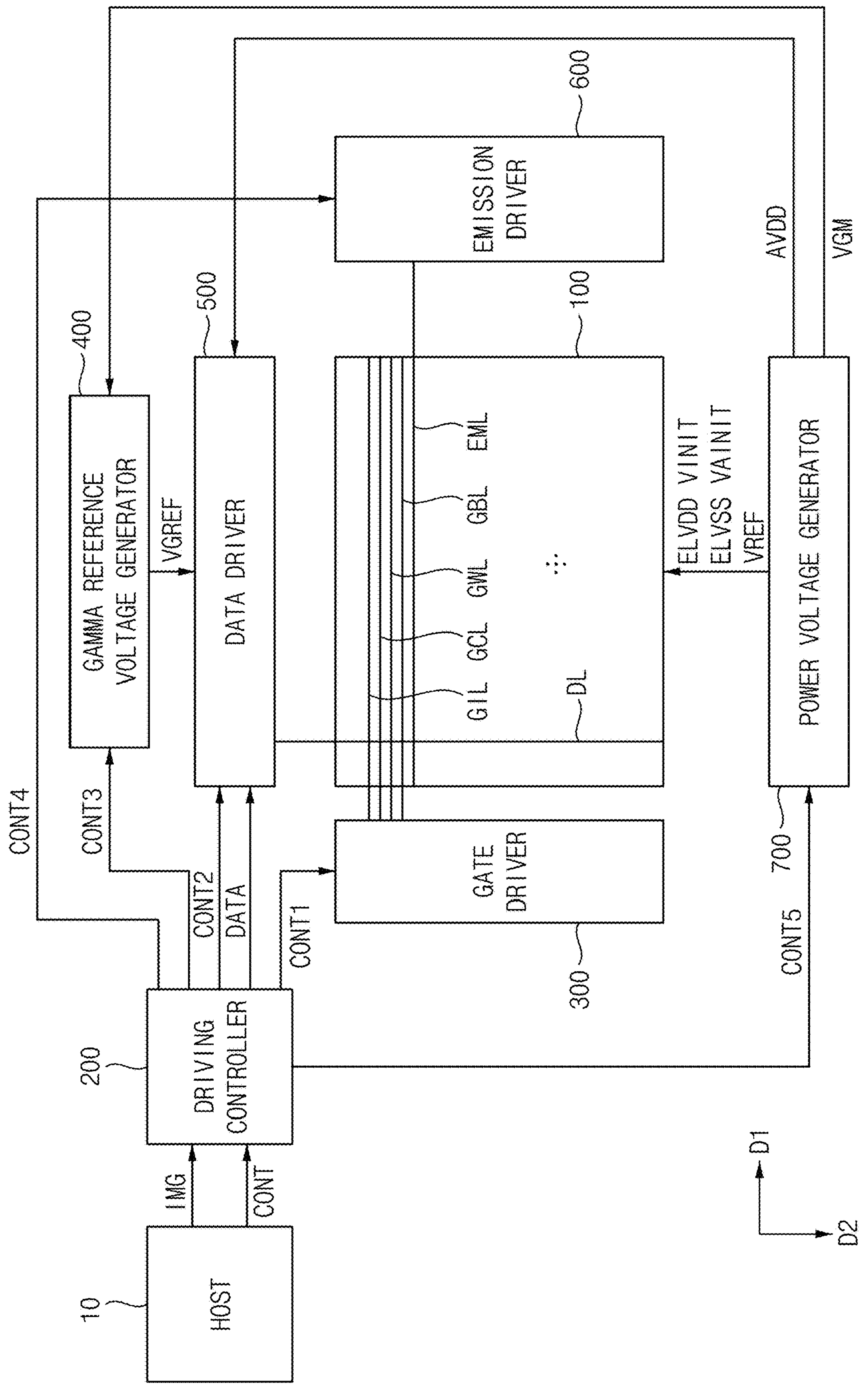
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver. The display panel driver includes a driving controller 200, a gate driver 300, a gamma reference voltage generator 400, a data driver 500, an emission driver 600 and a power voltage generator 700. The display apparatus may further include a host 10. According to an embodiment, the host 10 may be defined as an external element of the display apparatus or as an internal element of the display apparatus.

For example, the driving controller 200 and the data driver 500 may be integratedly formed. For example, the driving controller 200, the gamma reference voltage generator 400 and the data driver 500 may be integratedly formed. A driving module including at least the driving controller 200 and the data driver 500 may be referred to as a timing controller embedded data driver (TED).

The display panel 100 has a display region on which an image is displayed and a peripheral region adjacent to the display region.

The display panel 100 includes a plurality of gate lines GWL, GCL, GIL and GBL, a plurality of data lines DL, a plurality of emission lines EML and a plurality of pixels electrically connected to the gate lines GWL, GCL, GIL and GBL, the data lines DL and the emission lines EML. The gate lines GWL, GCL, GIL and GBL may extend in a first direction D1, the data lines DL may extend in a second direction D2 crossing the first direction D1 and the emission lines EML may extend in the first direction D1.

The host 10 may output input image data IMG and an input control signal CONT to the driving controller 200. For example, the host 10 may be referred to as a set, an application processor (AP) or a central processing unit (CPU).

The driving controller 200 may receive the input image data IMG and the input control signal CONT from the host 10. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3, a fourth control signal CONT4, a fifth control signal CONT5 and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the emission driver 600 based on the input control signal CONT, and output the fourth control signal CONT4 to the emission driver 600.

The driving controller 200 may generate the fifth control signal CONT5 for controlling an operation of the power voltage generator 700 based on the input control signal CONT, and output the fifth control signal CONT5 to the power voltage generator 700.

The gate driver 300 may generate gate signals driving the gate lines GWL, GCL, GIL and GBL in response to the first control signal CONT1 received from the driving controller 200. The gate driver 300 may output the gate signals to the gate lines GWL, GCL, GIL and GBL.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to a level of the data signal DATA.

In an embodiment, the gamma reference voltage generator 400 may be disposed in the driving controller 200, or in the data driver 500.

The data driver 500 may receive the second control signal CONT2 and the data signal DATA from the driving controller 200, and receive the gamma reference voltages VGREF from the gamma reference voltage generator 400. The data driver 500 may convert the data signal DATA into data voltages having an analog type using the gamma reference voltages VGREF. The data driver 500 may output the data voltages to the data lines DL.

The emission driver 600 may generate emission signals to drive the emission lines EML in response to the fourth control signal CONT4 received from the driving controller 200. The emission driver 600 may output the emission signals to the emission lines EML.

Although the gate driver 300 is disposed at a first side of the display panel 100 and the emission driver 600 is disposed at a second side of the display panel 100 opposite to the first side in FIG. 1 for convenience of explanation, the present inventive concept may not be limited thereto. For example, both of the gate driver 300 and the emission driver 600 may be disposed at the first side of the display panel 100. For example, the gate driver 300 and the emission driver 600 may be disposed at both sides of the display panel 100. For example, the gate driver 300 and the emission driver 600 may be integratedly formed.

Figure 2:
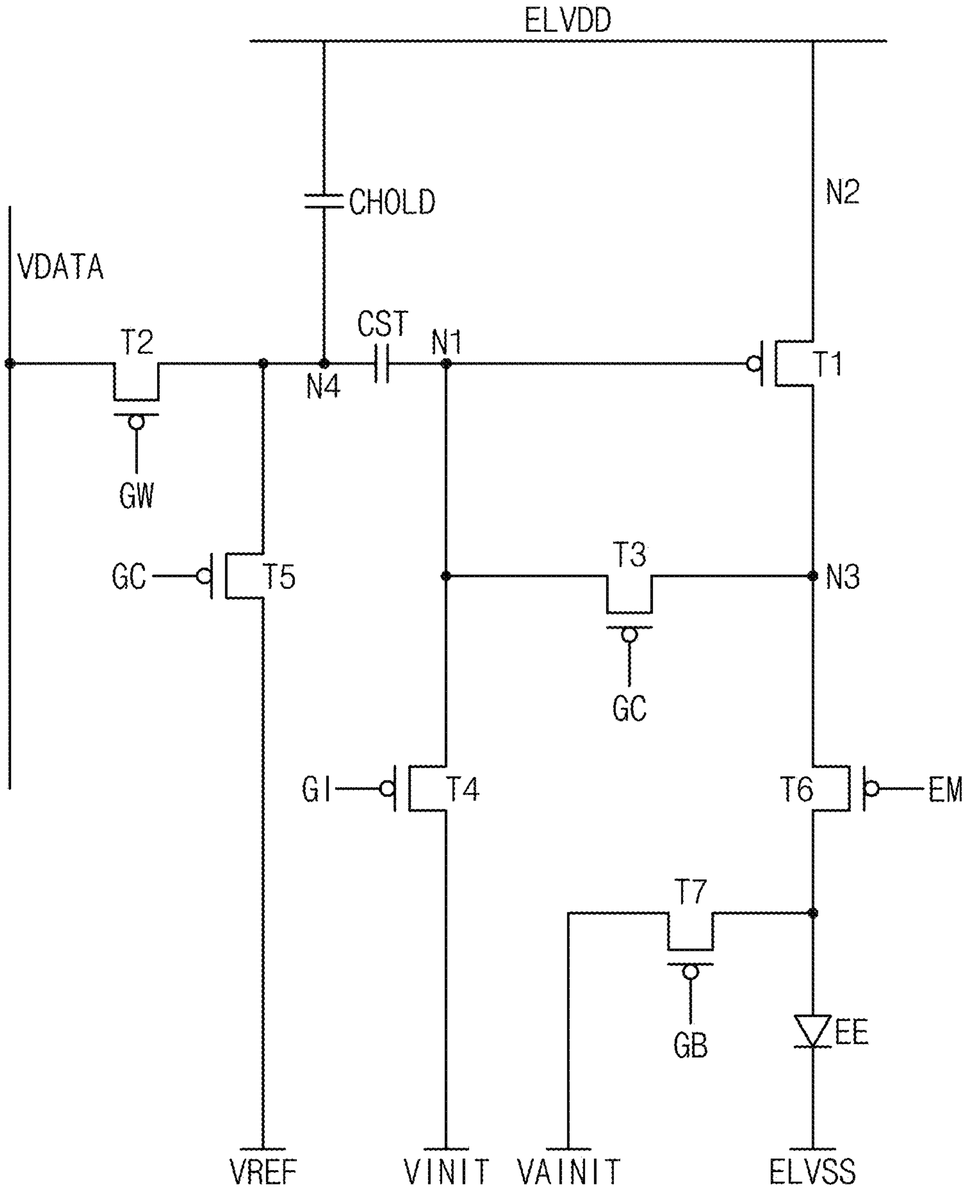
FIG. 2 is a circuit diagram illustrating an example of a pixel of the display panel of FIG. 1.

FIG. 2 is a circuit diagram illustrating an example of a pixel of the display panel 100 of FIG. 1.

Referring to FIGS. 1 and 2, the display panel 100 includes a plurality of pixels. Each of the pixels includes a light emitting element EE.

The pixel receives a data writing gate signal GW, a compensation gate signal GC, a data initialization gate signal GI, a light emitting element initialization signal GB, the data voltage VDATA and the emission signal EM and the light emitting element EE of the pixel emits light corresponding to the level of the data voltage VDATA to display the image.

A first power voltage ELVDD, a reference voltage VREF and the data voltage VDATA may be applied to the pixel. The reference voltage VREF may be lower than the first power voltage ELVDD. A driving current of the light emitting element EE may be determined by a difference between the reference voltage VREF and the data voltage VDATA.

In a conventional pixel circuit, the driving current of the light emitting element EE is determined by a difference between the first power voltage ELVDD and the data voltage VDATA. In contrast, in the pixel circuit of the present embodiment, the driving current of the light emitting element EE may be determined by the difference between the reference voltage VREF and the data voltage VDATA. Thus, levels of the data voltages VDATA may be decreased in the present embodiment and accordingly a level of a data power voltage applied to the data driver 500 may be decreased.

In the conventional pixel circuit, a gate-source voltage Vgs of a first switching element T1 satisfies Vgs=ELVDD−

(VDATA−VTH). In contrast, the gate-source voltage Vgs of the first switching element T1 may satisfy Vgs=VREF−(VDATA−VTH) in the pixel circuit of the present embodiment.

In other words, the levels of the data voltages VDATA may be decreased by a difference between the first power voltage ELVDD and the reference voltage VREF. For example, when the difference between the first power voltage ELVDD and the reference voltage VREF is 1.5V, the data voltage corresponding to a black grayscale level of the present embodiment may be lower than the data voltage corresponding to the black grayscale level of the conventional pixel circuit by 1.5V and the data voltage corresponding to a white grayscale level of the present embodiment may be lower than the data voltage corresponding to the white grayscale level of the conventional pixel circuit by 1.5V.

An embodiment of the pixel may include first to seventh switching elements T1 to T7, and first and second capacitors CST and CHOLD. The first switching element T1 includes a control electrode connected to a first node N1, a first electrode connected to a second node N2 and a second electrode connected to a third node N3. The second switching element T2 includes a control electrode receiving the data writing gate signal GW, a first electrode receiving the data voltage VDATA and a second electrode connected to a fourth node N4. The third switching element T3 includes a control electrode receiving the compensation gate signal GC, a first electrode connected to the first node N1 and a second electrode connected to the third node N3. The fourth switching element T4 includes a control electrode receiving the data initialization gate signal GI, a first electrode receiving a first initialization voltage VINIT and a second electrode connected to the first node N1. The fifth switching element T5 includes a control electrode receiving the compensation gate signal GC, a first electrode receiving the reference voltage VREF and a second electrode connected to the fourth node N4. The sixth switching element T6 includes a control electrode receiving the emission signal EM, a first electrode connected to the third node N3 and a second electrode connected to an anode electrode of the light emitting element EE. The seventh switching element T7 includes a control electrode receiving the light emitting element initialization gate signal GB, a first electrode receiving a second initialization voltage VAINIT and a second electrode connected to the anode electrode. The first capacitor CST includes a first electrode connected to the first node N1 and a second electrode connected to the fourth node N4. The second capacitor CHOLD includes a first electrode receiving the first power voltage ELVDD and a second electrode connected to the fourth node N4.

The light emitting element EE may include the anode electrode and a cathode electrode receiving a second power voltage ELVSS.

For example, the first power voltage ELVDD may be a high power voltage for light emission of the light emitting element EE and the second power voltage ELVSS may be a low power voltage for light emission of the light emitting element EE. The first power voltage ELVDD may be greater than the second power voltage ELVSS.

Each of the first to seventh switching elements T1 to T7 may include one transistor. The present inventive concept may not be limited thereto. Alternatively, one or more of the first to seventh switching elements T1 to T7 may include plural transistors which are connected to each other in series.

Although the first to seventh switching elements T1 to T7 are P-type transistors in FIG. 2, alternatively, at least one of the first to seventh switching elements T1 to T7 may be a N-type transistor.

Figure 3:
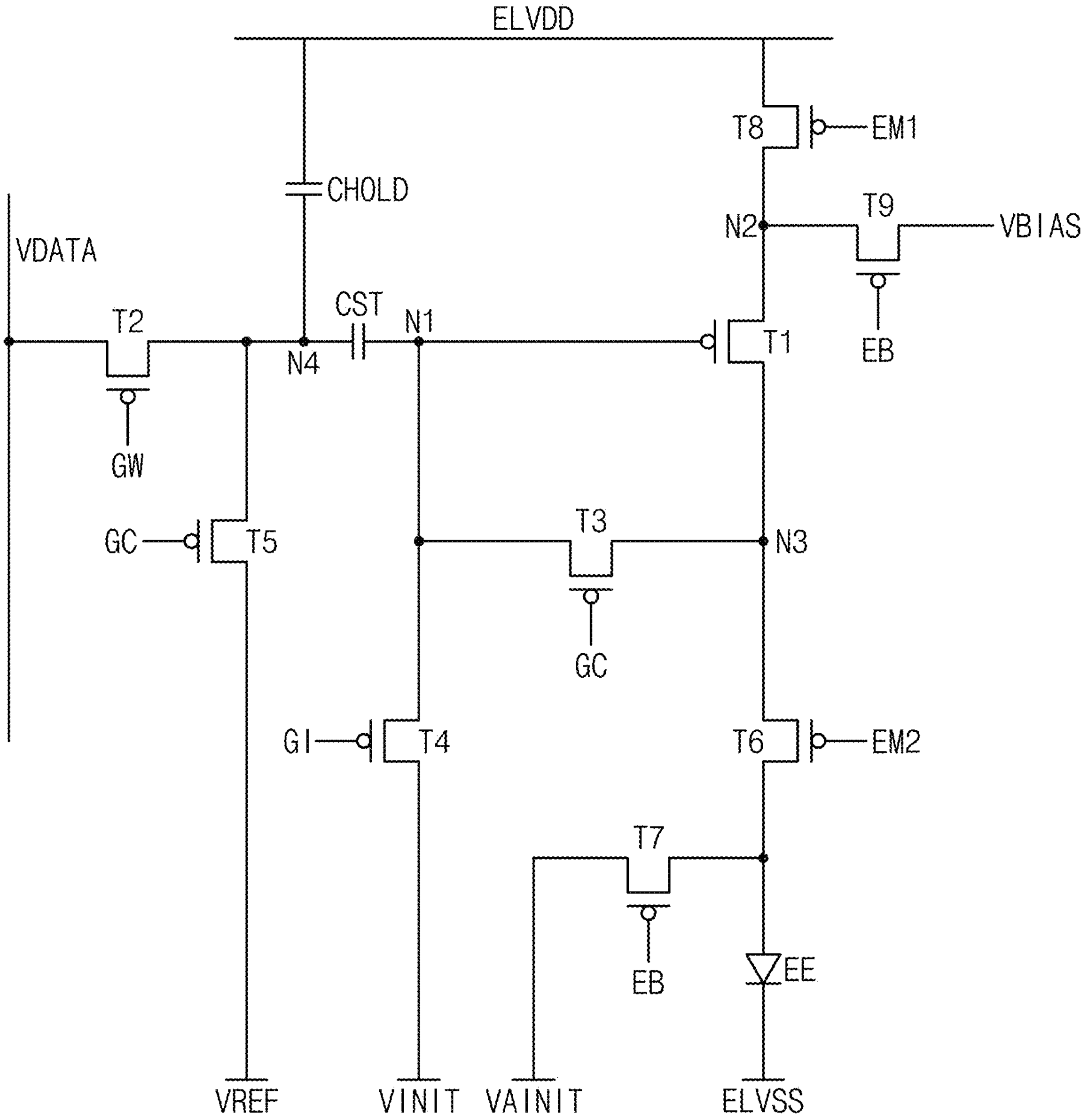
FIG. 3 is a circuit diagram illustrating an example of a pixel of the display panel of FIG. 1.

FIG. 3 is a circuit diagram illustrating an example of a pixel of the display panel 100 of FIG. 1.

The pixel circuit of FIG. 3 is substantially the same as the pixel circuit of FIG. 2 except that the pixel circuit further includes an eighth switching element and a ninth switching element and except for some input signals. Thus, repetitive explanation concerning the same elements may be omitted.

Referring to FIGS. 1 and 3, the display panel 100 includes a plurality of pixels. Each of the pixels includes a light emitting element EE.

The pixel receives a data writing gate signal GW, a compensation gate signal GC, a data initialization gate signal GI, a bias gate signal EB, the data voltage VDATA, a first emission signal EM1 and a second emission signal EM2. The light emitting element EE of the pixel emits light corresponding to the level of the data voltage VDATA to display the image.

A first power voltage ELVDD, a reference voltage VREF and the data voltage VDATA may be applied to the pixel. The reference voltage VREF may be lower than the first power voltage ELVDD. A driving current of the light emitting element EE may be determined by a difference between the reference voltage VREF and the data voltage VDATA.

The pixel may include first to ninth switching elements T1 to T9, and first and second capacitors CST and CHOLD. The first switching element T1 includes a control electrode connected to a first node N1, a first electrode connected to a second node N2 and a second electrode connected to a third node N3. The second switching element T2 includes a control electrode receiving the data writing gate signal GW, a first electrode receiving the data voltage VDATA and a second electrode connected to a fourth node N4. The third switching element T3 includes a control electrode receiving the compensation gate signal GC, a first electrode connected to the first node N1 and a second electrode connected to the third node N3. The fourth switching element T4 includes a control electrode receiving the data initialization gate signal GI, a first electrode receiving a first initialization voltage VINIT and a second electrode connected to the first node N1. The fifth switching element T5 includes a control electrode receiving the compensation gate signal GC, a first electrode receiving the reference voltage VREF and a second electrode connected to the fourth node N4. The sixth switching element T6 includes a control electrode receiving the second emission signal EM2, a first electrode connected to the third node N3 and a second electrode connected to an anode electrode of the light emitting element EE. The seventh switching element T7 includes a control electrode receiving the bias gate signal EB, a first electrode receiving a second initialization voltage VAINIT and a second electrode connected to the anode electrode. The eighth switching element T8 includes a control electrode receiving the first emission signal EM1, a first electrode receiving the first power voltage ELVDD and a second electrode connected to the second node N2. The ninth switching element T9 includes a control electrode receiving the bias gate signal EB, a first electrode receiving a bias voltage VBIAS and a second electrode connected to the second node N2. The first capacitor CST includes a first electrode connected to the first node N1 and a second electrode connected to the fourth node N4. The second capacitor CHOLD includes a first electrode receiving the first power voltage ELVDD and a second electrode connected to the fourth node N4.

The light emitting element EE may include the anode electrode and a cathode electrode receiving a second power voltage ELVSS.

Each of the first to ninth switching elements T1 to T9 may include one transistor. The present inventive concept may not be limited thereto. Alternatively, one or more of the first to ninth switching elements T1 to T9 may include plural transistors which are connected to each other in series.

Although the first to ninth switching elements T1 to T9 are P-type transistors in FIG. 3, alternatively, at least one of the first to ninth switching elements T1 to T9 may be a N-type transistor.

Figure 4:
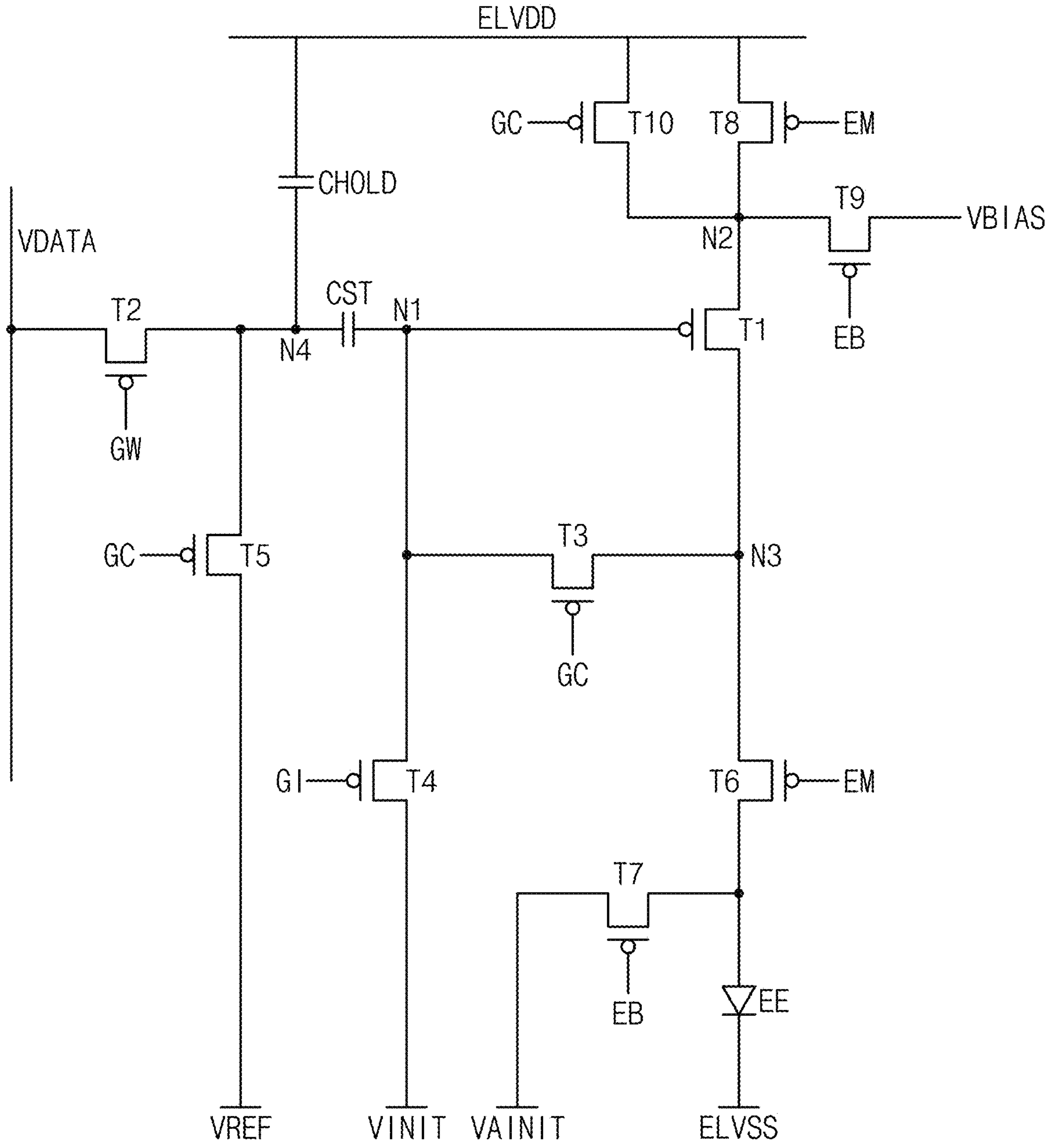
FIG. 4 is a circuit diagram illustrating an example of a pixel of the display panel of FIG. 1.

FIG. 4 is a circuit diagram illustrating an example of a pixel of the display panel 100 of FIG. 1.

The pixel circuit of FIG. 4 is substantially the same as the pixel circuit of FIG. 2 except that the pixel circuit further includes an eighth switching element, a ninth switching element and a tenth switching element and except for some input signals. Thus, repetitive explanation concerning the same elements may be omitted.

Referring to FIGS. 1 and 4, the display panel 100 includes a plurality of pixels. Each of the pixels includes a light emitting element EE.

The pixel receives a data writing gate signal GW, a compensation gate signal GC, a data initialization gate signal GI, a bias gate signal EB, the data voltage VDATA, and the emission signal EM. The light emitting element EE of the pixel emits light corresponding to the level of the data voltage VDATA to display the image.

A first power voltage ELVDD, a reference voltage VREF and the data voltage VDATA may be applied to the pixel. The reference voltage VREF may be lower than the first power voltage ELVDD. A driving current of the light emitting element EE may be determined by a difference between the reference voltage VREF and the data voltage VDATA.

The pixel may include first to tenth switching elements T1 to T10, and first and second capacitors CST and CHOLD. The first switching element T1 includes a control electrode connected to a first node N1, a first electrode connected to a second node N2 and a second electrode connected to a third node N3. The second switching element T2 includes a control electrode receiving the data writing gate signal GW, a first electrode receiving the data voltage VDATA and a second electrode connected to a fourth node N4. The third switching element T3 includes a control electrode receiving the compensation gate signal GC, a first electrode connected to the first node N1 and a second electrode connected to the third node N3. The fourth switching element T4 includes a control electrode receiving the data initialization gate signal GI, a first electrode receiving a first initialization voltage VINIT and a second electrode connected to the first node N1. The fifth switching element T5 includes a control electrode receiving the compensation gate signal GC, a first electrode receiving the reference voltage VREF and a second electrode connected to the fourth node N4. The sixth switching element T6 includes a control electrode receiving the emission signal EM, a first electrode connected to the third node N3 and a second electrode connected to an anode electrode of the light emitting element EE. The seventh switching element T7 includes a control electrode receiving the bias gate signal EB, a first electrode receiving a second initialization voltage VAINIT and a second electrode connected to the anode electrode. The eighth switching element T8 includes a control electrode receiving the emission signal EM, a first electrode receiving the first power voltage ELVDD and a second electrode connected to the second node N2. The ninth switching element T9 includes a control electrode receiving the bias gate signal EB, a first electrode receiving a bias voltage VBIAS and a second electrode connected to the second node N2. The tenth switching element T10 includes a control electrode receiving the compensation gate signal GC, a first electrode receiving the first power voltage ELVDD and a second electrode connected to the second node N2. The first capacitor CST includes a first electrode connected to the first node N1 and a second electrode connected to the fourth node N4. The second capacitor CHOLD includes a first electrode receiving the first power voltage ELVDD and a second electrode connected to the fourth node N4.

The light emitting element EE may include the anode electrode and a cathode electrode receiving a second power voltage ELVSS.

Each of the first to tenth switching elements T1 to T10 may include one transistor. The present inventive concept may not be limited thereto. Alternatively, one or more of the first to tenth switching elements T1 to T10 may include plural transistors which are connected to each other in series.

Although the first to tenth switching elements T1 to T10 are P-type transistors in FIG. 4, alternatively, at least one of the first to ninth switching elements T1 to T9 may be a N-type transistor.

Figures 5, 6:
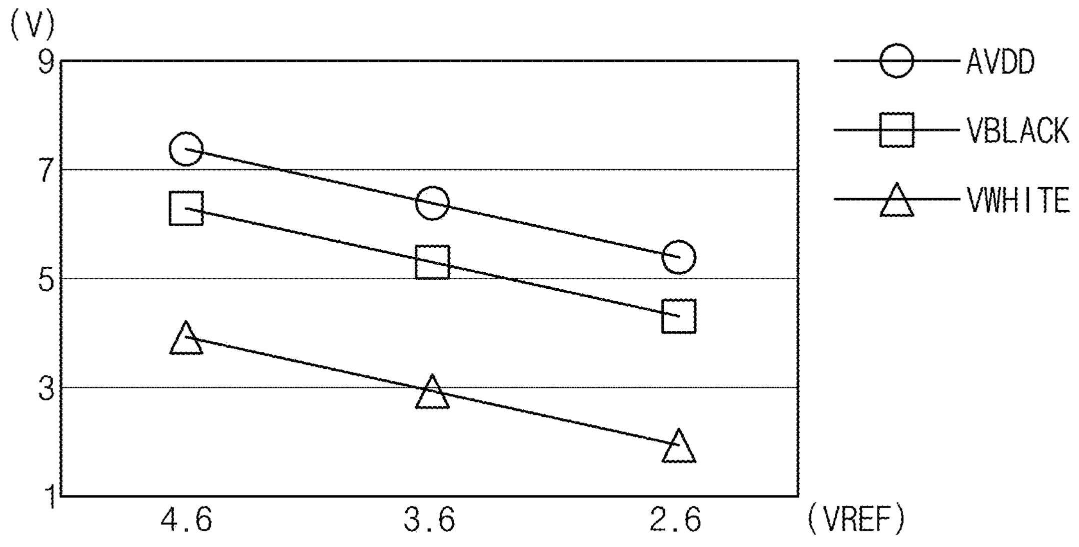
FIG. 5 is a table illustrating an example of a voltage of a fourth node of a pixel circuit of FIG. 2 and a voltage of a first node of the pixel circuit of FIG. 2.
FIG. 6 is a graph illustrating levels of data power voltages, level of black data voltages and levels of white data voltages in a normal mode, a first power saving mode and a second power saving mode of the display apparatus of FIG. 1.
Figure 7:
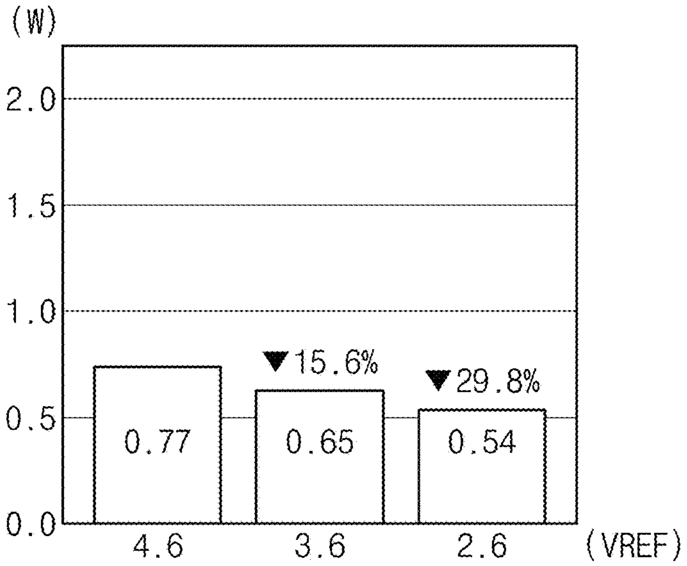
FIG. 7 is a graph illustrating power consumptions of the display apparatus of FIG. 1 according to the normal mode, the first power saving mode and the second power saving mode of the display apparatus of FIG. 1 when the display panel of FIG. 1 displays a white image.
Figure 8:
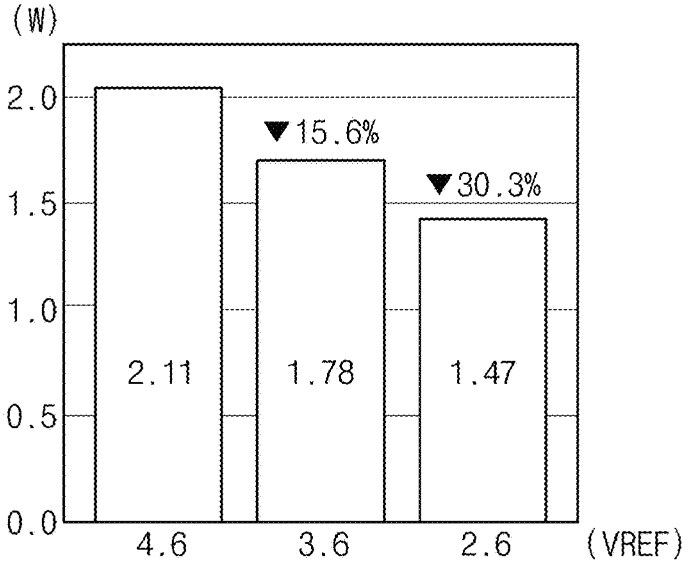
FIG. 8 is a graph illustrating power consumptions of the display apparatus of FIG. 1 according to the normal mode, the first power saving mode and the second power saving mode of the display apparatus of FIG. 1 when the display panel of FIG. 1 displays a horizontal stripe image.

FIG. 5 is a table illustrating an example of a voltage VN4 of the fourth node N4 of the pixel circuit of FIG. 2 and a voltage VN1 of the first node N1 of the pixel circuit of FIG. 2 for a black data voltage VBLACK. FIG. 6 is a graph illustrating levels of data power voltages AVDD, level of black data voltages VBLACK and levels of white data voltages VWHITE in a normal mode, a first power saving mode and a second power saving mode of the display apparatus of FIG. 1. FIG. 7 is a graph illustrating power consumptions of the display apparatus of FIG. 1 according to the normal mode, the first power saving mode and the second power saving mode of the display apparatus of FIG. 1 when the display panel 100 of FIG. 1 displays a white image. FIG. 8 is a graph illustrating power consumptions of the display apparatus of FIG. 1 according to the normal mode, the first power saving mode and the second power saving mode of the display apparatus of FIG. 1 when the display panel 100 of FIG. 1 displays a horizontal stripe image.

Referring to FIGS. 1 to 8, in the pixel circuit of the present embodiment in which the data voltage VDATA is applied to the first switching element T1 using a coupling of the first capacitor CHOLD, an equation of a driving current of the light emitting element EE may be a following Equation 1.

$$IEE = \frac{1}{2}u\,\mathrm{Cox}\frac{W}{L}(VREF - VDATA)^2 \qquad \text{[Equation 1]}$$

Herein, IEE is the current flowing through the light emitting element EE, u is a mobility of the first switching element T1, Cox is a capacitance of the first switching element T1 and W/L is a ratio of a width and a length of a channel of the first switching element T1.

As shown in Equation 1, the equation of the driving current of the light emitting element EE may be determined by the difference between the reference voltage VREF and the data voltage VDATA. Thus, a luminance of the light emitting element EE may be maintained when levels of the reference voltage VREF and the data voltage VDATA are decreased together while maintaining the difference between the reference voltage VREF and the data voltage VDATA.

Referring to FIGS. 5 and 6, a first driving mode may be the normal mode. For example, in the first driving mode, the reference voltage VREF may be 4.6V, the data power voltage AVDD may be 7.5V, the black data voltage VBLACK may be 6.5V and the white data voltage VWHITE may be 4.0V.

A second driving mode may be the first power saving mode. For example, in the second driving mode, the reference voltage VREF may be 3.6V, the data power voltage AVDD may be 6.5V, the black data voltage VBLACK may be 5.5V and the white data voltage VWHITE may be 3.0V.

A third driving mode may be the second power saving mode. For example, in the third driving mode, the reference voltage VREF may be 2.6V, the data power voltage AVDD may be 5.5V, the black data voltage VBLACK may be 4.5V and the white data voltage VWHITE may be 2.0V.

As shown in FIG. 7, when the display panel 100 displays a white image in the first driving mode, the power consumption of the display apparatus may be 0.77 W.

When the display panel 100 displays a white image in the second driving mode, the power consumption of the display apparatus may be 0.65 W. The power consumption of the display apparatus when the display panel 100 displays the white image in the second driving mode may be reduced by 15.6% compared to in the first driving mode.

When the display panel 100 displays a white image in the third driving mode, the power consumption of the display apparatus may be 0.54 W. The power consumption of the display apparatus when the display panel 100 displays the white image in the third driving mode may be reduced by 29.9% compared to in the first driving mode.

As shown in FIG. 8, when the display panel 100 displays a horizontal stripe image in the first driving mode, the power consumption of the display apparatus may be 2.11 W.

When the display panel 100 displays a horizontal stripe image in the second driving mode, the power consumption of the display apparatus may be 1.78 W. The power consumption of the display apparatus when the display panel 100 displays the horizontal stripe image in the second driving mode may be reduced by 15.6% compared to in the first driving mode.

When the display panel 100 displays a horizontal stripe image in the third driving mode, the power consumption of the display apparatus may be 1.47 W. The power consumption of the display apparatus when the display panel 100 displays the horizontal stripe image in the third driving mode may be reduced by 30.3% compared to in the first driving mode.

Figure 9:
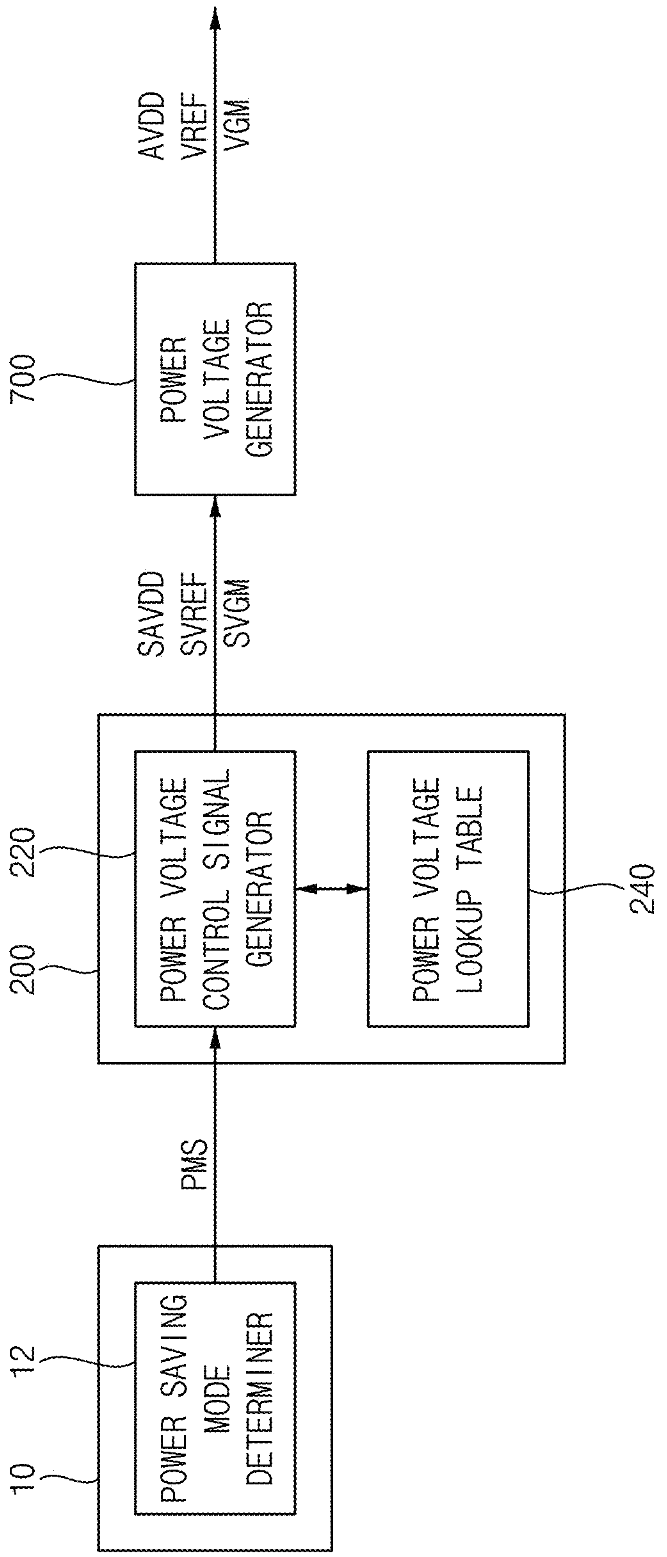
FIG. 9 is a block diagram illustrating a power saving mode determiner, a power voltage control signal generator, a power voltage lookup table and a power voltage generator of the display apparatus of FIG. 1.
Figure 11:
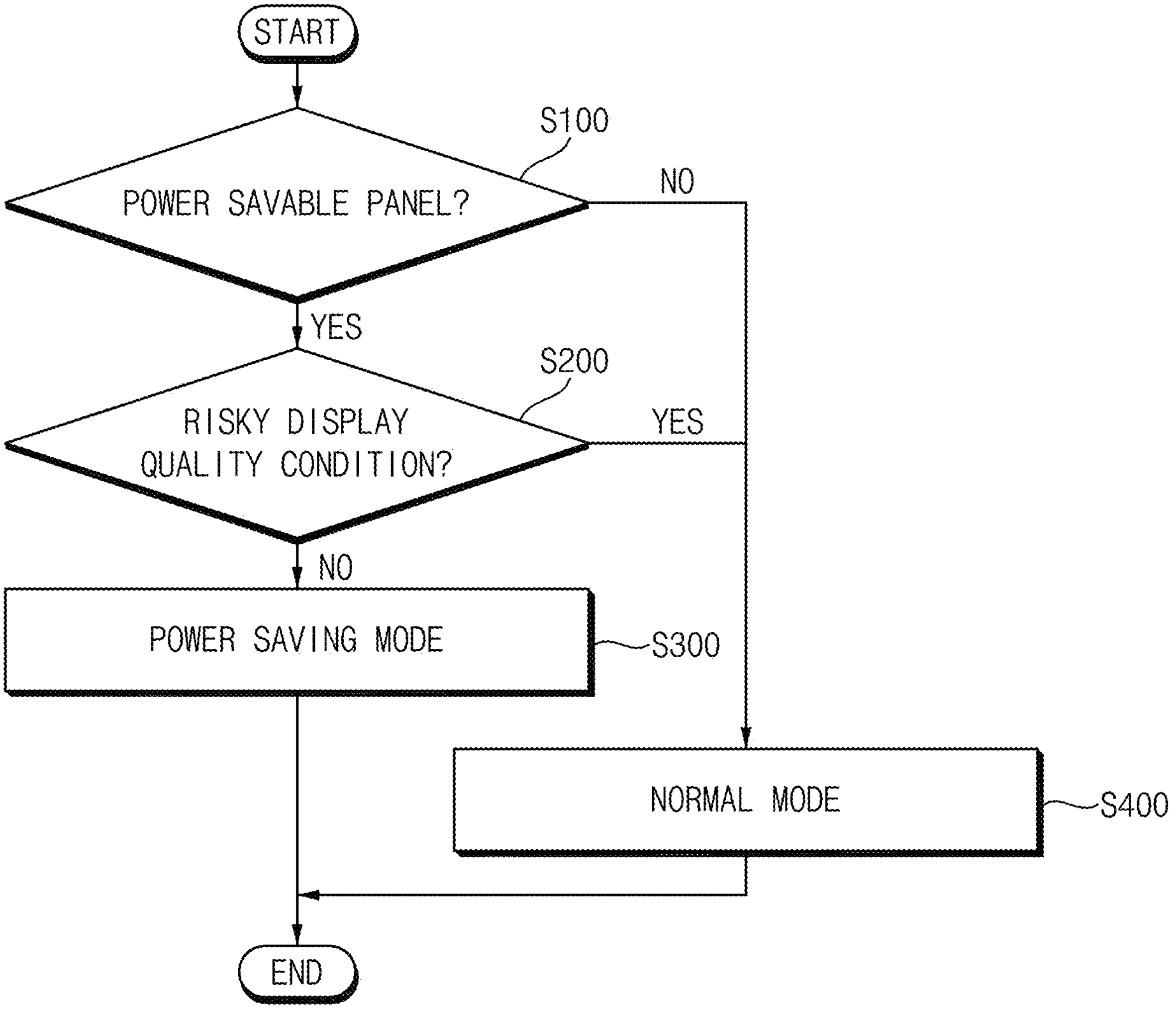
FIG. 11 is a flowchart illustrating an operation of the power saving mode determiner of FIG. 9.
Figure 12:
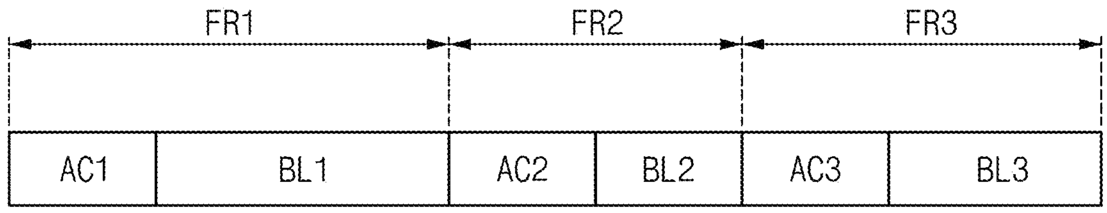
FIG. 12 is a diagram illustrating a case in which the display apparatus of FIG. 1 is driven in a variable frequency driving method.
Figure 13:
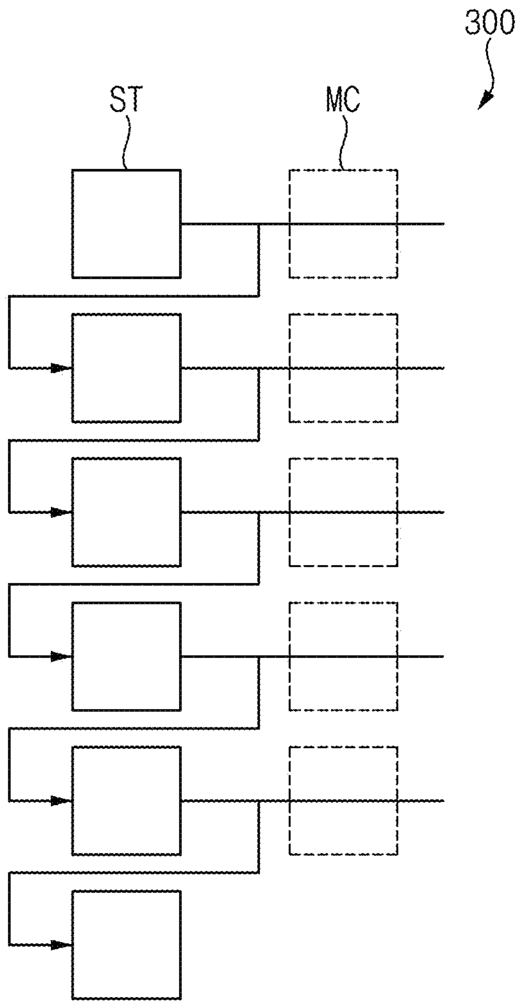
FIG. 13 is a block diagram illustrating a gate driver of FIG. 1 when the display apparatus of FIG. 1 is driven in a multi frequency driving method.
Figure 14:
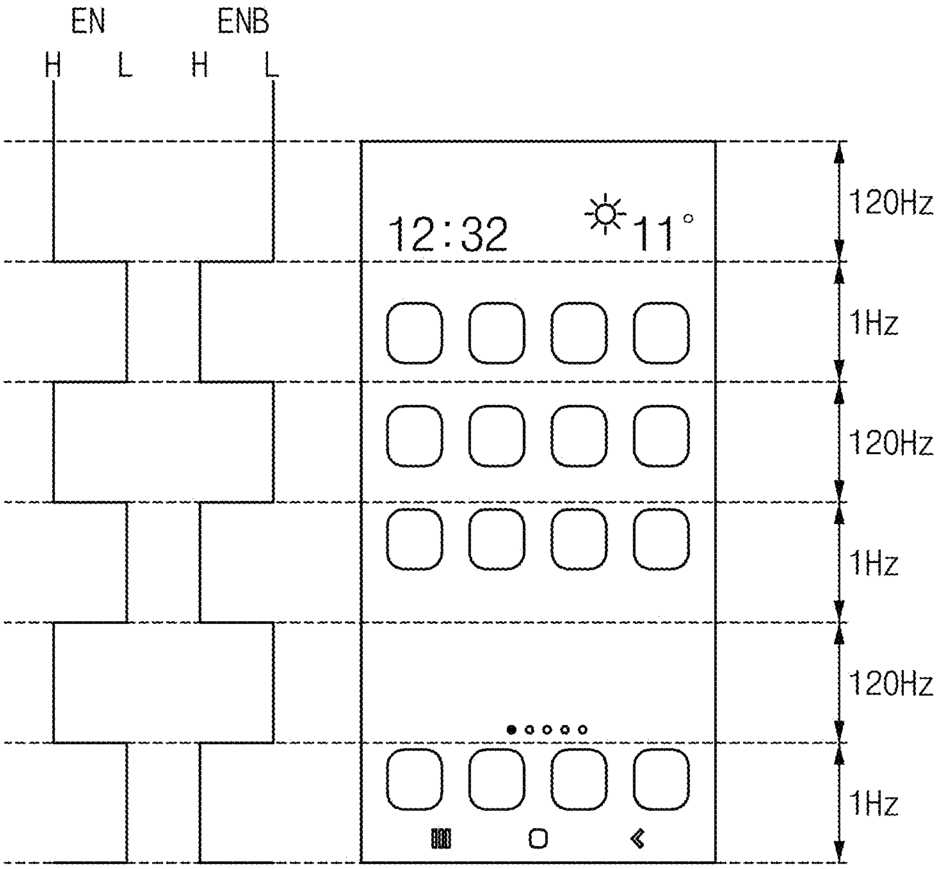
FIG. 14 is a diagram illustrating a case in which the display apparatus of FIG. 1 is driven in the multi frequency driving method.

FIG. 9 is a block diagram illustrating a power saving mode determiner 12, a power voltage control signal generator 220, a power voltage lookup table 240 and the power voltage generator 700 of the display apparatus of FIG. 1. FIG. 10 is a table illustrating an example of the power voltage lookup table 240 of FIG. 9. FIG. 11 is a flowchart illustrating an operation of the power saving mode determiner 12 of FIG. 9. FIG. 12 is a diagram illustrating a case in which the display apparatus of FIG. 1 is driven in a variable frequency driving method. FIG. 13 is a block diagram illustrating the gate driver 300 of FIG. 1 when the display apparatus of FIG. 1 is driven in a multi frequency driving method. FIG. 14 is a diagram illustrating a case in which the display apparatus of FIG. 1 is driven in the multi frequency driving method.

Referring to FIGS. 1 to 14, the display apparatus includes the display panel 100, the data driver 500 outputting the data voltage VDATA to the display panel 100, the power saving mode determiner 12 selecting a driving mode from a power saving mode and the normal mode based on a risky display quality condition, the power voltage control signal generator 220 generating a power voltage control signal SAVDD, SVREF and SVGM determining a level of a power voltage AVDD, VREF and VGM based on the power saving mode and the normal mode and the power voltage generator 700 generating the power voltage AVDD, VREF and VGM based on the power voltage control signal SAVDD, SVREF and SVGM and outputting the power voltage AVDD, VREF and VGM to at least one of the display panel 100 and the data driver 500. A risky display quality condition occurs when a quality of a displayed image or a portion of the displayed image is anticipated to be poor in the power saving mode.

The power saving mode determiner 12 may output a driving mode signal selected from a power saving mode signal PMS indicating the power saving mode DPS or the normal mode to the power voltage control signal generator 220.

For example, when the power saving mode signal PMS is zero, the power saving mode signal PMS may indicate the power saving mode. For example, when the power saving mode signal PMS is one, the power saving mode signal PMS may indicate the normal mode. Although the power saving mode determiner 12 may determine one of the power saving mode (PMS=0) and the normal mode (PMS=1) in FIG. 10, the present inventive concept may not be limited thereto. The power saving mode may indicate a plurality of power saving modes.

The power voltage generator 700 may generate the power voltage having a first level in the normal mode. The power voltage generator 700 may generate the power voltage having a second level lower than the first level in the power saving mode.

For example the power voltage generator 700 may generate the data power voltage AVDD having 7.5V in the normal mode. For example the power voltage generator 700 may generate the data power voltage AVDD having 5.5V which is lower than 7.5V in the power saving mode.

For example, the power voltage generator 700 may generate the reference voltage VREF having 4.6V in the normal mode. For example the power voltage generator 700 may generate the reference voltage VREF having 2.6V which is lower than 4.6V in the power saving mode.

For example, the power voltage generator 700 may generate a gamma power voltage VGM having 3.0V in the normal mode. For example the power voltage generator 700 may generate the gamma power voltage VGM having 1.0V which is lower than 3.0V in the power saving mode.

The gamma reference voltage generator 400 may generate the gamma reference voltage VGREF based on the gamma power voltage VGM. The gamma reference voltage generator 400 may output the gamma reference voltage VGREF to the data driver 500.

For example, when a status of the display apparatus is not in the risky display quality condition, the power saving mode determiner 12 may determine a driving mode to the power saving mode. In contrast, when the status of the display apparatus is in the risky display quality condition, the power saving mode determiner 12 may determine the driving mode to the normal mode.

For example, the risky display quality condition may occur if a driving frequency of the display panel 100 is lower than a threshold frequency and a poor display quality is anticipated based on a display image. When the driving frequency of the display panel 100 is low, a current leakage may occur at a switching element of a pixel circuit of the display panel 100 so that a display quality may be deteriorated due to the current leakage. In addition, the deterioration of the display quality due to the current leakage may be more serious in the power saving mode in which the level of the reference voltage VREF and the level of the data voltage VDATA are relatively low.

Thus, when the status of the display apparatus is in the risky display quality condition in which the driving frequency of the display panel 100 is lower than the threshold frequency, the display apparatus may be operated not in the power saving mode but in the normal mode.

For example, the risky display quality condition may be a condition in which the display apparatus is operated in an always on mode (AOD). In the always on mode, the display panel is operated in the low driving frequency so that the display quality may be deteriorated due to the current leakage.

For example, the risky display quality condition may be in a condition in which the display apparatus is driven in a variable frequency driving method in which a driving frequency of the display panel 100 in a second frame is different from a driving frequency of the display panel 100 in a first frame.

FIG. 12 represents the variable frequency driving method of the display panel 100. The display panel 100 may be driven in the variable frequency. A first frame FR1 having a first frequency may include a first active period AC1 and a first blank period BL1. A second frame FR2 having a second frequency different from the first frequency may include a second active period AC2 and a second blank period BL2. A third frame FR3 having a third frequency different from the first frequency and the second frequency may include a third active period AC3 and a third blank period BL3.

The first active period AC1 may have a time length same as a time length of the second active period AC2. The first blank period BL1 may have a time length different from a time length of the second blank period BL2.

The second active period AC2 may have a time length same as a time length of the third active period AC3. The second blank period BL2 may have a time length different from a time length of the third blank period BL3.

A driving timing of the display apparatus may include a writing frame, when the data voltage VDATA is written in the pixel and the light emitting element emits a light, and a holding frame, when the data voltage VDATA is not written in the pixel and the light emitting element emits a light. The writing frame may be in the active period AC1, AC2 and AC3. The holding frame may be in the blank period BL1, BL2 and BL3.

For example, when the display panel 100 is driven in the variable frequency driving method, the display panel 100 may be driven in a low frequency so that the display quality may be deteriorated due to the current leakage. In addition, the deterioration of the display quality due to the current leakage may be more serious in the power saving mode in which the level of the reference voltage VREF and the level of the data voltage VDATA are relatively low.

In addition, when the display panel 100 is driven in the variable frequency driving method and the driving frequency of the display panel 100 is changed from a first frequency to a second frequency, a difference between a luminance of an image in the first frequency and a luminance of an image in the second frequency may be generated and the display quality may be deteriorated due to the luminance difference between in the first frequency and the second frequency. In addition, the deterioration of the display quality due to the luminance difference may be more serious in the power saving mode in which the level of the reference voltage VREF and the level of the data voltage VDATA are relatively low.

Thus, when the status of the display apparatus is in the risky display quality condition in which the display panel 100 is driven in the variable frequency driving method, the display apparatus may be operated not in the power saving mode but in the normal mode.

For example, the risky display quality condition may be a condition in which the display apparatus is driven in a multi frequency driving method in which a driving frequency of a first area of the display panel 100 is different from a driving frequency of a second area of the display panel 100.

FIGS. 13 and 14 represent a multi frequency driving method (a multiple division of a driving frequency) of the display panel 100. As shown in FIG. 13, the gate driver 300 may include a carry generator ST and a gate signal masking circuit MC connected to the carry generator ST.

The gate signal masking circuit MC may output or not output a gate pulse according to the carry signal, a first enable signal EN and a second enable signal ENB.

For example, when the first enable signal EN has a high level H and the second enable signal ENB has a low level L, the gate signal masking circuit MC may output the gate pulse.

For example, when the first enable signal EN has a low level L and the second enable signal ENB has a high level H, the gate signal masking circuit MC may not output the gate pulse.

As shown in FIG. 14, the gate driver 300 may output the gate pulse at a high frequency (e.g., 120 Hz) for a portion of the display panel 100 where a high frequency driving is necessary, and may output a gate pulse at a low frequency (e.g., 1 Hz) for a portion of the display panel 100 where a low frequency driving is necessary according to the first enable signal EN and the second enable signal ENB.

The gate signal masking circuit MC may mask an output of the gate pulse to output the gate pulse in the low frequency (e.g., 1 Hz). The carry generator ST transfers the carry signal to a next stage regardless of the operation of the gate signal masking circuit MC masking the output of the gate pulse so that the gate driver 300 may support the multiple division of the driving frequency.

For example, when the display panel 100 is driven in the multiple frequency driving method, a portion of the display panel 100 may be driven in a low frequency so that the display quality may be deteriorated due to the current leakage. In addition, the deterioration of the display quality due to the current leakage may be more serious in the power saving mode in which the level of the reference voltage VREF and the level of the data voltage VDATA are relatively low.

In addition, when the display panel 100 is driven in the multiple frequency driving method, a difference between a luminance of a first area of the display panel 100 driven in a first frequency and a luminance of a second area of the display panel 100 driven in a second frequency may be generated and the display quality may be deteriorated due to the luminance difference between in the first area and the second area. In addition, the deterioration of the display quality due to the luminance difference may be more serious in the power saving mode in which the level of the reference voltage VREF and the level of the data voltage VDATA are relatively low.

Thus, when the status of the display apparatus is in the risky display quality condition in which the display panel 100 is driven in the multiple frequency driving method, the display apparatus may be operated not in the power saving mode but in the normal mode.

Referring to FIG. 11, the power saving mode determiner 12 may determine whether the display panel 100 is a power savable panel or not (operation S100).

When the display panel 100 is not the power savable panel, the driving mode may be determined to the normal mode (operation S400). When the display panel 100 is not the power savable panel, the equation of the driving current of the light emitting element of the display panel 100 may be determined not by the difference between the reference voltage VREF and the data voltage VDATA but by the difference between the first power voltage ELVDD and the data voltage VDATA. In contrast, when the display panel 100 is the power savable panel, the equation of the driving current of the light emitting element of the display panel 100 may be determined by the difference between the reference voltage VREF and the data voltage VDATA.

When the display panel 100 is the power savable panel, the power saving mode determiner 12 may determine whether the status of the display apparatus is in the risky display quality condition (operation S200).

When the display panel 100 is the power savable panel and the status of the display apparatus is in the risky display quality condition, the driving mode may be determined to the normal mode (operation S400).

When the display panel 100 is the power savable panel and the status of the display apparatus is not in the risky display quality condition, the driving mode may be determined to the power saving mode (operation S300).

Referring to FIG. 9, the power voltage control signal generator 220 may generate a data power voltage control signal SAVDD determining a level of the data power voltage AVDD applied to the data driver 500 and a reference voltage control signal SVREF determining a level of the reference voltage VREF.

The power voltage generator 700 may generate the data power voltage AVDD based on the data power voltage control signal SAVDD and output the data power voltage AVDD to the data driver 500. The power voltage generator 700 may generate the reference voltage VREF based on the reference voltage control signal SVREF and output the reference voltage VREF to the display panel 100.

In addition, the power voltage control signal generator 220 may generate a gamma power voltage control signal SVGM determining a level of the gamma power voltage VGM.

The power voltage generator 700 may generate the gamma power voltage VGM based on the gamma power voltage control signal SVGM and output the gamma power voltage VGM to the gamma reference voltage generator 400.

The display apparatus may further include the power voltage lookup table 240 storing the power voltage control signal SAVDD, SVREF and SVGM according to the power saving mode and the normal mode.

The power voltage control signal generator 220 may generate the power voltage control signal SAVDD, SVREF and SVGM based on the power saving mode signal PMS received from the power saving mode determiner 12 and referring to the power voltage lookup table 240.

The power voltage lookup table 240 may store the power voltage control signal SAVDD, SVREF and SVGM in the normal mode and the power voltage control signal SAVDD, SVREF and SVGM in the power saving mode.

In FIG. 10, the data power voltage AVDD may be 7.5V, the reference voltage VREF may be 4.6V and the gamma power voltage VGM may be 3.0V in the normal mode in which the power saving mode signal PMS is one.

The data power voltage AVDD may be 5.5V, the reference voltage VREF may be 2.6V and the gamma power voltage VGM may be 1.0V in the power saving mode in which the power saving mode signal PMS is zero.

Referring to FIG. 9, the host 10 may include the power saving mode determiner 12. The driving controller 200 may include the power voltage control signal generator 220 and the power voltage lookup table 240.

According to the present embodiment, the power saving mode determiner 12 determines the power saving mode based on the risky display quality condition, the power voltage control signal generator 220 generates the power voltage control signal SAVDD, SVREF and SVGM representing the level of the power voltage AVDD, VREF and VGM in the power saving mode and in the normal mode and the power voltage generator 700 generates the power voltage AVDD, VREF and VGM according to the power voltage control signal SAVDD, SVREF and SVGM.

In this way, the power saving mode may be selectively operated so that the power consumption of the display apparatus may be reduced and the display quality of the display panel 100 may be enhanced.

Figures 15, 16:
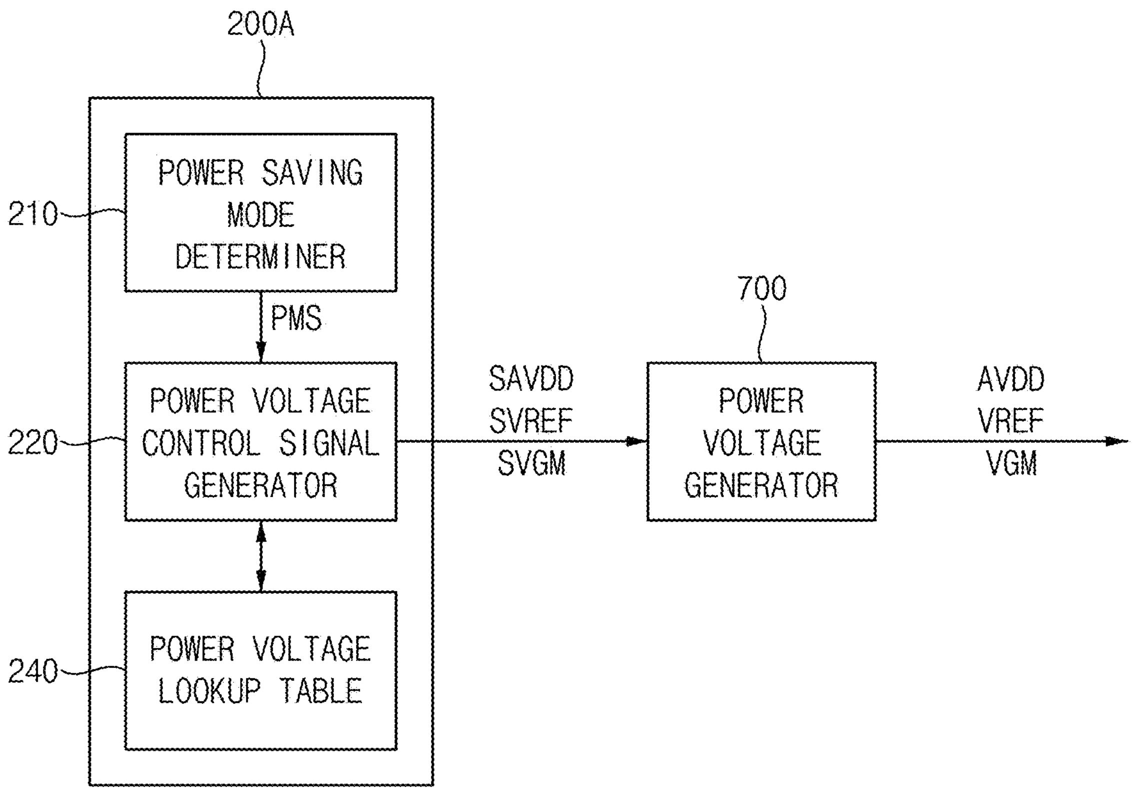
FIG. 15 is a table illustrating an example of a power voltage lookup table of a display apparatus according to an embodiment of the present inventive concept.
FIG. 16 is a block diagram illustrating a power saving mode determiner, a power voltage control signal generator, a power voltage lookup table and a power voltage generator of a display apparatus according to an embodiment of the present inventive concept.

FIG. 15 is a table illustrating an example of a power voltage lookup table of a display apparatus according to an embodiment of the present inventive concept.

The display apparatus according to the present embodiment is substantially the same as the display apparatus of the previous embodiment explained referring to FIGS. 1 to 14 except that the power voltage lookup table includes four driving modes. Thus, the same reference numerals will be used to refer to the same or like parts as those described in the previous embodiment of FIGS. 1 to 14 and repetitive explanation concerning the above elements may be omitted.

Referring to FIGS. 1 to 9 and 11 to 15, the power voltage generator 700 may generate the power voltage having a first level in a normal mode MODE4. The power voltage generator 700 may generate the power voltage having a second level lower than the first level in a power saving mode MODE1, MODE2 and MODE3.

The power voltage generator 700 may generate the power voltage having a first level in a normal mode MODE4. The power voltage generator 700 may generate the power voltage having a second level lower than the first level in a first power saving mode MODE3. The power voltage generator 700 may generate the power voltage having a third level lower than the second level in a second power saving mode MODE2. The power voltage generator 700 may generate the power voltage having a fourth level lower than the third level in a third power saving mode MODE1.

The power voltage lookup table 240 may store the power voltage control signal SAVDD, SVREF and SVGM in the power saving mode MODE1, MODE2 and MODE3 and the power voltage control signal SAVDD, SVREF and SVGM in the normal mode MODE4.

The power voltage control signal generator 220 may generate the power voltage control signal SAVDD, SVREF and SVGM based on the power saving mode signal PMS received from the power saving mode determiner 12 and referring to the power voltage lookup table 240.

The power voltage lookup table 240 may store the power voltage control signal SAVDD, SVREF and SVGM in the normal mode MODE4 and the power voltage control signal SAVDD, SVREF and SVGM in the power saving mode MODE1, MODE2 and MODE3.

In FIG. 15, the data power voltage AVDD may be 7.5V, the reference voltage VREF may be 4.6V and the gamma power voltage VGM may be 3.0V in the normal mode MODE4 in which the power saving mode signal PMS is 11.

The data power voltage AVDD may be 7.0V, the reference voltage VREF may be 4.1V and the gamma power voltage VGM may be 2.5V in the first power saving mode MODE3 in which the power saving mode signal PMS is 10.

The data power voltage AVDD may be 6.5V, the reference voltage VREF may be 3.6V and the gamma power voltage VGM may be 2.0V in the second power saving mode MODE2 in which the power saving mode signal PMS is 01.

The data power voltage AVDD may be 5.5V, the reference voltage VREF may be 2.6V and the gamma power voltage VGM may be 1.0V in the third power saving mode MODE1 in which the power saving mode signal PMS is 00.

For example, the power saving mode determiner 12 may determine whether the display panel 100 is the power savable panel or not.

For example, when the display panel 100 is not the power savable panel, the driving mode may be determined to the normal mode MODE4.

When the display panel 100 is the power savable panel, the power saving mode determiner 12 may determine whether the status of the display apparatus is in the risky display quality condition.

In the present embodiment, when the display panel 100 is the power savable panel, the driving mode may be determined to one of the normal mode MODE4, the first power saving mode MODE3, the second power saving mode MODE2 and the third power saving mode MODE1 according to a degree of the risky display quality condition.

When the degree of the risky display quality condition is great, the display apparatus may be driven in the normal mode MODE4. As the degree of the risky display quality condition decreases, the display apparatus may be sequentially driven in the first power saving mode MODE3, the second power saving mode MODE2 and the third power saving mode MODE1.

In an embodiment, when the power voltage generator 700 generates the power voltage having a first level in the normal mode MODE4 and the power voltage having a second level in the third power saving mode MODE1, the power voltage having a level between the first level and the second level may be generated in a transition period (e.g. MODE2 and MODE3) in which the driving mode is changed from the normal mode MODE4 to the third power saving mode MODE1 or from the third power saving mode MODE1 to the normal mode MODE4.

In other words, when the driving mode is changed from the normal mode MODE4 to the third power saving mode MODE1, the level of the power voltage may be gradually decreased. In addition, when the driving mode is changed from the third power saving mode MODEL to the normal mode MODE4, the level of the power voltage may be gradually increased.

According to the present embodiment, the power saving mode determiner 12 determines the power saving mode based on the risky display quality condition, the power voltage control signal generator 220 generates the power voltage control signal SAVDD, SVREF and SVGM representing the level of the power voltage AVDD, VREF and VGM in the power saving mode and in the normal mode and the power voltage generator 700 generates the power voltage AVDD, VREF and VGM according to the power voltage control signal SAVDD, SVREF and SVGM.

In this way, the power saving mode DPS may be selectively operated so that the power consumption of the display apparatus may be reduced and the display quality of the display panel 100 may be enhanced.

FIG. 16 is a block diagram illustrating a power saving mode determiner, a power voltage control signal generator, a power voltage lookup table and a power voltage generator of a display apparatus according to an embodiment of the present inventive concept.

The display apparatus according to the present embodiment is substantially the same as the display apparatus of the previous embodiment explained referring to FIGS. 1 to 14 except for a position of the power saving mode determiner. Thus, the same reference numerals will be used to refer to the same or like parts as those described in the previous embodiment of FIGS. 1 to 14 and repetitive explanation concerning the above elements may be omitted.

Referring to FIGS. 1 to 8, 10 to 14 and 16, the display apparatus includes the display panel 100, the data driver 500 outputting the data voltage VDATA to the display panel 100, the power saving mode determiner 210 determining a power saving mode and the normal mode based on a risky display quality condition, the power voltage control signal generator 220 generating a power voltage control signal SAVDD, SVREF and SVGM determining a level of a power voltage AVDD, VREF and VGM based on the power saving mode and the normal mode and the power voltage generator 700 generating the power voltage AVDD, VREF and VGM based on the power voltage control signal SAVDD, SVREF and SVGM and outputting the power voltage AVDD, VREF and VGM to at least one of the display panel 100 and the data driver 500.

The display apparatus may further include a driving controller 200A controlling an operation of the data driver 500 and an operation of the power voltage generator 700.

The display apparatus may further include a power voltage lookup table 240 storing the power voltage control signal SAVDD, SVREF and SVGM according to the power saving mode and the normal mode.

In the present embodiment, the driving controller 200A may include the power saving mode determiner 210, the power voltage control signal generator 220 and the power voltage lookup table 240.

According to the present embodiment, the power saving mode determiner 210 determines the power saving mode based on the risky display quality condition, the power voltage control signal generator 220 generates the power voltage control signal SAVDD, SVREF and SVGM representing the level of the power voltage AVDD, VREF and VGM in the power saving mode and in the normal mode and the power voltage generator 700 generates the power voltage AVDD, VREF and VGM according to the power voltage control signal SAVDD, SVREF and SVGM.

In this way, the power saving mode DPS may be selectively operated so that the power consumption of the display apparatus may be reduced and the display quality of the display panel 100 may be enhanced.

Figure 17:
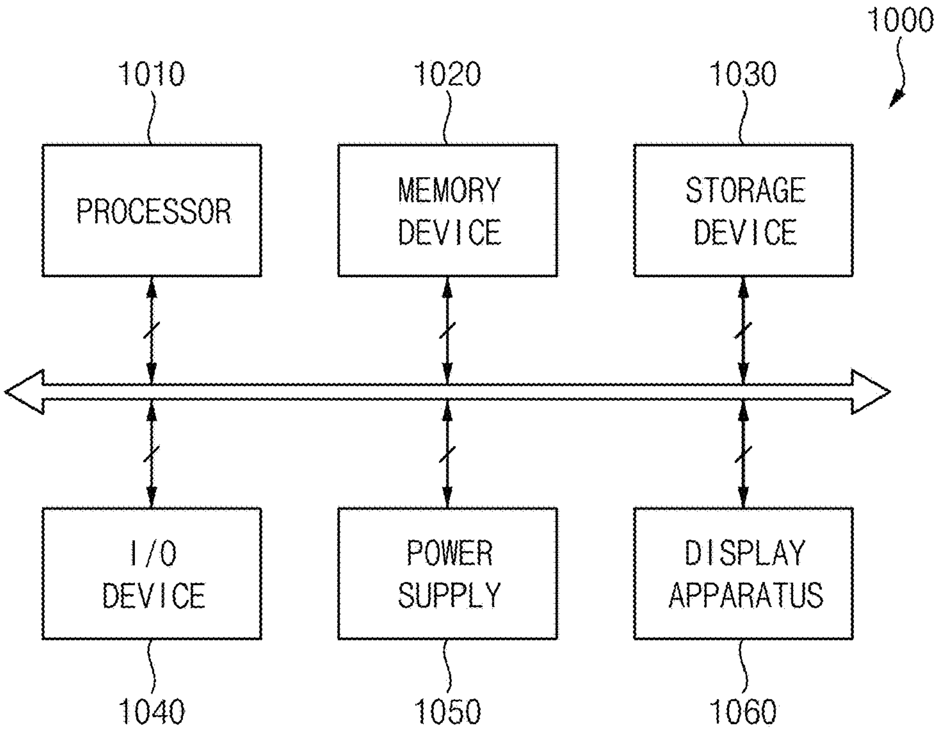
FIG. 17 is a block diagram illustrating an electronic apparatus according to an embodiment of the present inventive concept.
Figure 18:
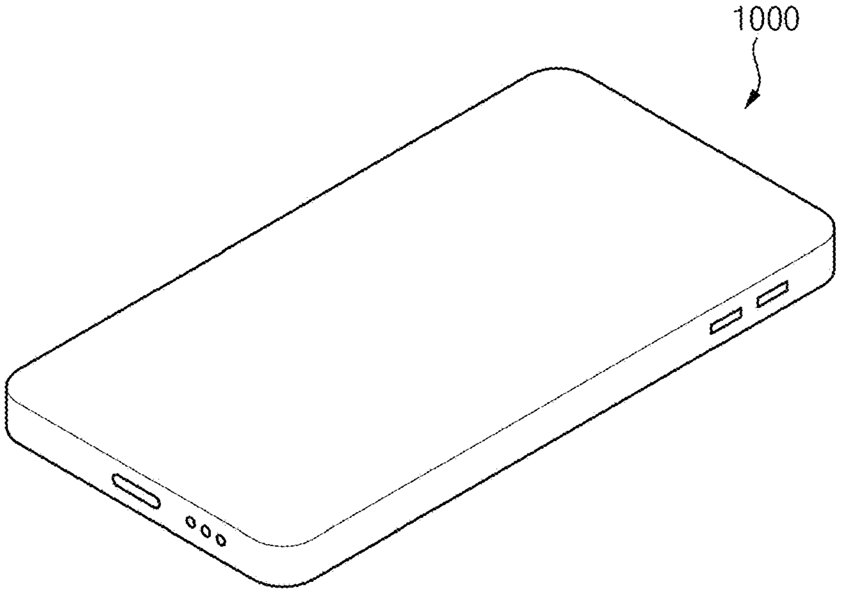
FIG. 18 is a diagram illustrating an example in which the electronic apparatus of FIG. 17 is implemented as a smart phone.

FIG. 17 is a block diagram illustrating an electronic apparatus according to an embodiment of the present inventive concept. FIG. 18 is a diagram illustrating an example in which the electronic apparatus of FIG. 17 is implemented as a smart phone.

Referring to FIGS. 17 and 18, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG.

1. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 18, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1. The processor 1010 may be the host 10 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

According to the embodiments of the display apparatus and the method of driving the display apparatus, the power consumption of the display apparatus may be reduced and the display quality of the display apparatus may be enhanced.

The foregoing is illustrative of the present inventive concept and is not to be construed as limiting thereof. Although embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A display apparatus comprising:

a display panel;

a data driver configured to output a data voltage to the display panel;

a power saving mode determiner configured to determine a driving mode selected from a power saving mode and a normal mode based on a risky display quality condition;

a power voltage control signal generator configured to generate a power voltage control signal determining a level of a power voltage based on the driving mode; and a power voltage generator configured to generate the power voltage based on the power voltage control signal and to output the power voltage to at least one of the display panel and the data driver.

2. The display apparatus of claim 1, wherein the power voltage generator is configured to generate the power voltage having a first level in the normal mode, and wherein the power voltage generator is configured to generate the power voltage having a second level lower than the first level in the power saving mode.

3. The display apparatus of claim 2, wherein the power voltage generator is configured to generate the power voltage having a level between the first level and the second level in a transition period in which a driving mode of the display apparatus is changed from the normal mode to the power saving mode or from the power saving mode to the normal mode.

4. The display apparatus of claim 1, wherein the power voltage generator is configured to generate the power voltage having a first level in the normal mode, wherein the power voltage generator is configured to generate the power voltage having a second level lower than the first level in a first power saving mode, and wherein the power voltage generator is configured to generate the power voltage having a third level lower than the second level in a second power saving mode.

5. The display apparatus of claim 1, wherein when a status of the display apparatus is not in the risky display quality condition, the power saving mode determiner is configured to determine the driving mode as the power saving mode, and wherein when the status of the display apparatus is in the risky display quality condition, the power saving mode determiner is configured to determine the driving mode as the normal mode.

6. The display apparatus of claim 5, wherein the risky display quality condition is a condition in which a driving frequency of the display panel is lower than a threshold frequency.

7. The display apparatus of claim 5, wherein the risky display quality condition is a condition in which the display apparatus is driven in a variable frequency driving method in which a driving frequency of the display panel in a second frame is different from a driving frequency of the display panel in a first frame.

8. The display apparatus of claim 5, wherein the risky display quality condition is a condition in which the display apparatus is driven in a multi frequency driving method in which a driving frequency of a first area of the display panel is different from a driving frequency of a second area of the display panel.

9. The display apparatus of claim 1, wherein when the display panel is a power savable panel and a status of the display apparatus is not in the risky display quality condition, the power saving mode determiner is configured to determine a driving mode as the power saving mode, and wherein when the display panel is not the power savable panel or when the display panel is the power savable panel and the status of the display apparatus is in the risky display quality condition, the power saving mode determiner is configured to determine the driving mode as the normal mode.

10. The display apparatus of claim 1, wherein the display panel comprises a pixel including a light emitting element, wherein the pixel is configured to receive a first power voltage, a reference voltage and the data voltage, wherein the reference voltage is lower than the first power voltage, and wherein a driving current of the light emitting element is determined by a difference between the reference voltage and the data voltage.

11. The display apparatus of claim 10, wherein the power voltage control signal generator is configured to generate a data power voltage control signal determining a level of a data power voltage applied to the data driver and a reference voltage control signal determining a level of the reference voltage, and wherein the power voltage generator is configured to generate the data power voltage based on the data power voltage control signal and output the data power voltage to the data driver, and configured to generate the reference voltage based on the reference voltage control signal and to output the reference voltage to the display panel.

12. The display apparatus of claim 11, further comprising a gamma reference voltage generator configured to output a gamma reference voltage to the data driver based on a gamma power voltage, wherein the power voltage control signal generator is configured to generate a gamma power voltage control signal determining a level of the gamma power voltage, and wherein the power voltage generator is configured to generate the gamma power voltage based on the gamma power voltage control signal and output the gamma power voltage to the gamma reference voltage generator.

13. The display apparatus of claim 10, wherein the pixel comprises:

a first switching element including a control electrode connected to a first node, a first electrode connected to a second node and a second electrode connected to a third node;

a second switching element including a control electrode configured to receive a data writing gate signal, a first electrode configured to receive the data voltage and a second electrode connected to a fourth node;

a third switching element including a control electrode configured to receive a compensation gate signal, a first electrode connected to the first node and a second electrode connected to the third node;

a fourth switching element including a control electrode configured to receive a data initialization gate signal, a first electrode configured to receive a first initialization voltage and a second electrode connected to the first node;

a fifth switching element including a control electrode configured to receive the compensation gate signal, a first electrode configured to receive the reference voltage and a second electrode connected to the fourth node;

a sixth switching element including a control electrode configured to receive an emission signal, a first electrode connected to the third node and a second electrode connected to an anode electrode of the light emitting element;

a seventh switching element including a control electrode configured to receive a light emitting element initialization gate signal, a first electrode configured to receive a second initialization voltage and a second electrode connected to the anode electrode;

a first capacitor including a first electrode connected to the first node and a second electrode connected to the fourth node; and a second capacitor including a first electrode configured to receive the first power voltage and a second electrode connected to the fourth node.

14. The display apparatus of claim 10, wherein the pixel comprises:

a first switching element including a control electrode connected to a first node, a first electrode connected to a second node and a second electrode connected to a third node;

a second switching element including a control electrode configured to receive a data writing gate signal, a first electrode configured to receive the data voltage and a second electrode connected to a fourth node;

a third switching element including a control electrode configured to receive a compensation gate signal, a first electrode connected to the first node and a second electrode connected to the third node;

a fourth switching element including a control electrode configured to receive a data initialization gate signal, a first electrode configured to receive a first initialization voltage and a second electrode connected to the first node;

a fifth switching element including a control electrode configured to receive the compensation gate signal, a first electrode configured to receive the reference voltage and a second electrode connected to the fourth node;

a sixth switching element including a control electrode configured to receive a second emission signal, a first electrode connected to the third node and a second electrode connected to an anode electrode of the light emitting element;

a seventh switching element including a control electrode configured to receive a bias gate signal, a first electrode configured to receive a second initialization voltage and a second electrode connected to the anode electrode;

an eighth switching element including a control electrode configured to receive a first emission signal, a first electrode configured to receive the first power voltage and a second electrode connected to the second node;

a ninth switching element including a control electrode configured to receive the bias gate signal, a first electrode configured to receive a bias voltage and a second electrode connected to the second node;

a first capacitor including a first electrode connected to the first node and a second electrode connected to the fourth node; and a second capacitor including a first electrode configured to receive the first power voltage and a second electrode connected to the fourth node.

15. The display apparatus of claim 10, wherein the pixel comprises:

a first switching element including a control electrode connected to a first node, a first electrode connected to a second node and a second electrode connected to a third node;

a second switching element including a control electrode configured to receive a data writing gate signal, a first electrode configured to receive the data voltage and a second electrode connected to a fourth node;

a third switching element including a control electrode configured to receive a compensation gate signal, a first electrode connected to the first node and a second electrode connected to the third node;

a fourth switching element including a control electrode configured to receive a data initialization gate signal, a first electrode configured to receive a first initialization voltage and a second electrode connected to the first node;

a fifth switching element including a control electrode configured to receive the compensation gate signal, a first electrode configured to receive the reference voltage and a second electrode connected to the fourth node;

a sixth switching element including a control electrode configured to receive an emission signal, a first electrode connected to the third node and a second electrode connected to an anode electrode of the light emitting element;

a seventh switching element including a control electrode configured to receive a bias gate signal, a first electrode configured to receive a second initialization voltage and a second electrode connected to the anode electrode;

an eighth switching element including a control electrode configured to receive the emission signal, a first electrode configured to receive the first power voltage and a second electrode connected to the second node;

a ninth switching element including a control electrode configured to receive the bias gate signal, a first electrode configured to receive a bias voltage and a second electrode connected to the second node;

a tenth switching element including a control electrode configured to receive the compensation gate signal, a first electrode configured to receive the first power voltage and a second electrode connected to the second node;

a first capacitor including a first electrode connected to the first node and a second electrode connected to the fourth node; and a second capacitor including a first electrode configured to receive the first power voltage and a second electrode connected to the fourth node.

16. The display apparatus of claim 1, further comprising a power voltage lookup table configured to store the power voltage control signal according to the power saving mode and the normal mode.

17. The display apparatus of claim 16, further comprising:

a driving controller configured to control an operation of the data driver and an operation of the power voltage generator; and a host configured to output input image data and an input control signal to the driving controller, wherein the host includes the power saving mode determiner, and wherein the driving controller includes the power voltage control signal generator and the power voltage lookup table.

18. The display apparatus of claim 16, further comprising a driving controller configured to control an operation of the data driver and an operation of the power voltage generator, wherein the driving controller includes the power saving mode determiner, the power voltage control signal generator and the power voltage lookup table.

19. A method of driving a display apparatus, the method comprising:

determining a driving mode selected from a power saving mode and a normal mode based on a risky display quality condition;

generating a power voltage control signal determining a level of a power voltage based on the driving mode;

generating the power voltage based on the power voltage control signal and outputting the power voltage to at least one of a display panel and a data driver; and outputting a data voltage to the display panel based on input image data by the data driver.

20. The method of claim 19, wherein the determining the driving mode comprises:

determining the driving mode as the power saving mode when the display panel is a power savable panel and a status of the display apparatus is not in the risky display quality condition; and determining the driving mode as the normal mode when the display panel is not the power savable panel or when the display panel is the power savable panel and the status of the display apparatus is in the risky display quality condition.

* * * * *